(12) United States Patent
Rübhausen et al.

(10) Patent No.: US 7,384,254 B2
(45) Date of Patent: Jun. 10, 2008

(54) COEXTRUSION ADAPTER

(75) Inventors: Anton Rübhausen, Niederkassel (DE); Peter Siebigteroth, Eitorf (DE)

(73) Assignee: Reifenhäuser GmbH & Co. Maschinenfabrik, Troisdorf (DE)

( * ) Notice: Subject to any disclaimer, the term of this patent is extended or adjusted under 35 U.S.C. 154(b) by 209 days.

(21) Appl. No.: 11/187,636

(22) Filed: Jul. 22, 2005

(65) Prior Publication Data

US 2006/0040009 A1   Feb. 23, 2006

(30) Foreign Application Priority Data

Jul. 27, 2004   (DE)   ............. 20 2004 011 742 U

(51) Int. Cl.
   *B29C 47/16*   (2006.01)
(52) U.S. Cl. .................. 425/133.5; 425/466
(58) Field of Classification Search ............ 425/133.5, 425/113, 190, 466
   See application file for complete search history.

(56) References Cited

U.S. PATENT DOCUMENTS

| | | | | |
|---|---|---|---|---|
| 1,885,747 A * | 11/1932 | Maurer | .................. | 425/466 |
| 3,480,998 A * | 12/1969 | Von Erdberg | ............ | 425/133.5 |
| 3,792,945 A * | 2/1974 | Randall | .................. | 425/132 |
| 3,877,857 A * | 4/1975 | Melead | .................. | 425/133.5 |
| 4,161,385 A * | 7/1979 | Goldstein et al. | ........... | 425/462 |
| 4,197,069 A * | 4/1980 | Cloeren | .................. | 425/131.1 |
| 4,472,129 A * | 9/1984 | Siard | .................. | 425/381 |
| 4,600,550 A * | 7/1986 | Cloren | .................. | 264/173.13 |
| 4,708,618 A * | 11/1987 | Reifenhauser et al. | ... | 425/133.5 |
| 4,780,258 A * | 10/1988 | Cloeren | .................. | 264/173.12 |
| 4,789,513 A * | 12/1988 | Cloeren | .................. | 264/173.13 |
| 4,839,131 A * | 6/1989 | Cloeren | .................. | 264/173.12 |
| 5,066,443 A * | 11/1991 | Cloeren | .................. | 264/173.14 |
| 5,076,776 A * | 12/1991 | Yamada et al. | .......... | 425/133.1 |
| 5,147,195 A * | 9/1992 | Cloeren | .................. | 425/133.5 |
| 5,489,402 A * | 2/1996 | Knoblauch et al. | ......... | 264/407 |
| 5,522,719 A * | 6/1996 | Umeda et al. | ............. | 425/380 |
| 6,352,424 B1 * | 3/2002 | Ulcej | .................. | 425/145 |

FOREIGN PATENT DOCUMENTS

| | | |
|---|---|---|
| DE | 37 41 793 A1 | 7/1989 |
| DE | 298 20 347 U1 | 5/1999 |
| DE | 197 57 827 A1 | 6/1999 |
| EP | 0 161 812 | 11/1985 |
| EP | 0 315 304 | 5/1989 |

* cited by examiner

*Primary Examiner*—James P. Mackey
*Assistant Examiner*—Seyed Masoud Malekzadeh
(74) *Attorney, Agent, or Firm*—Pauley Petersen & Erickson

(57) ABSTRACT

A coextrusion adapter for an extrusion installation with extruders and a tool for producing a composite coextrusion structure of thermoplastic material. The coextrusion adapter has a central conduit with an end at an inlet side for connecting an extruder and an end at an outlet side for connecting the tool. The coextrusion adapter has at least one coextrusion conduit with an inlet end and an outlet end. A second extruder can be connected to the inlet end. At an end facing the outlet end the adjusting elements have a wedge-shape adjusting section with one wedge surface facing the central conduit and another wedge surface facing the outlet end of the coextrusion conduit. The adjusting section of the adjusting elements is pivotal around an axis extending over the width of the outlet end by the actuating drives. When an increase of the inside diameter of the respective transverse section of the outlet end occurs the corresponding transverse section of the central conduit is narrowed, and vice versa.

19 Claims, 4 Drawing Sheets

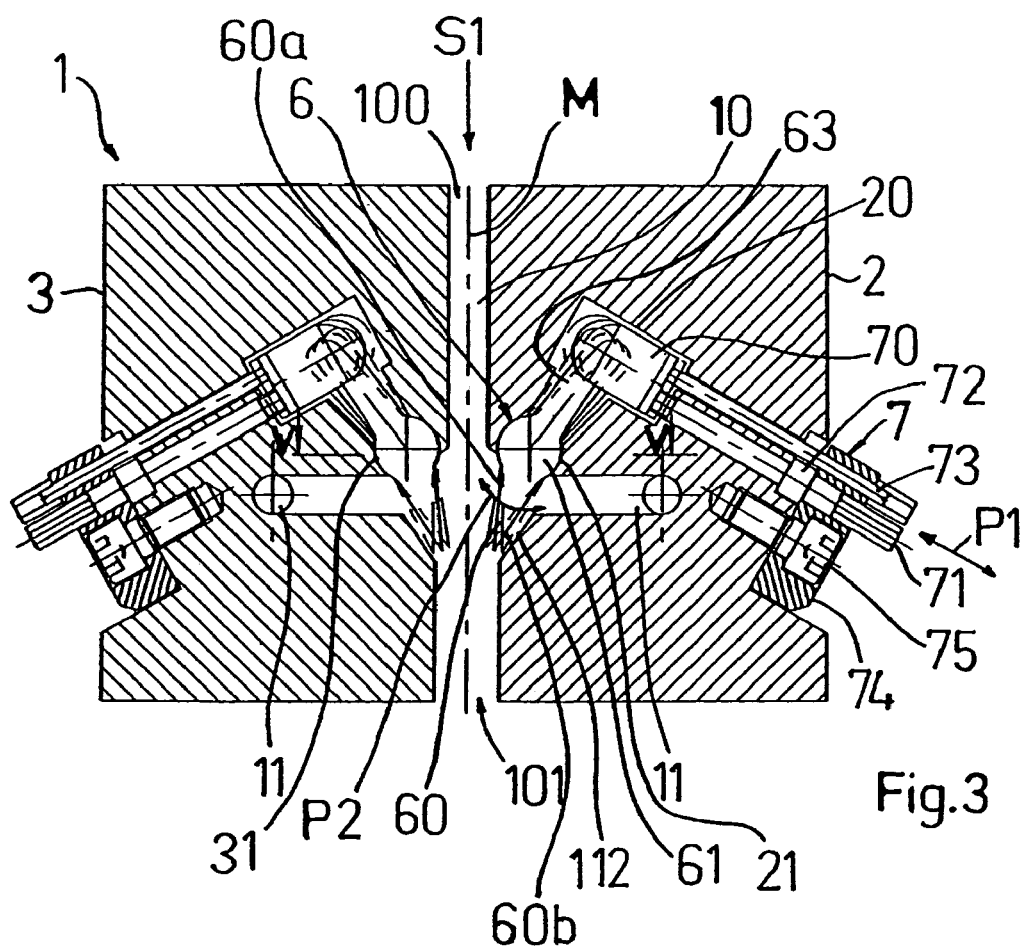
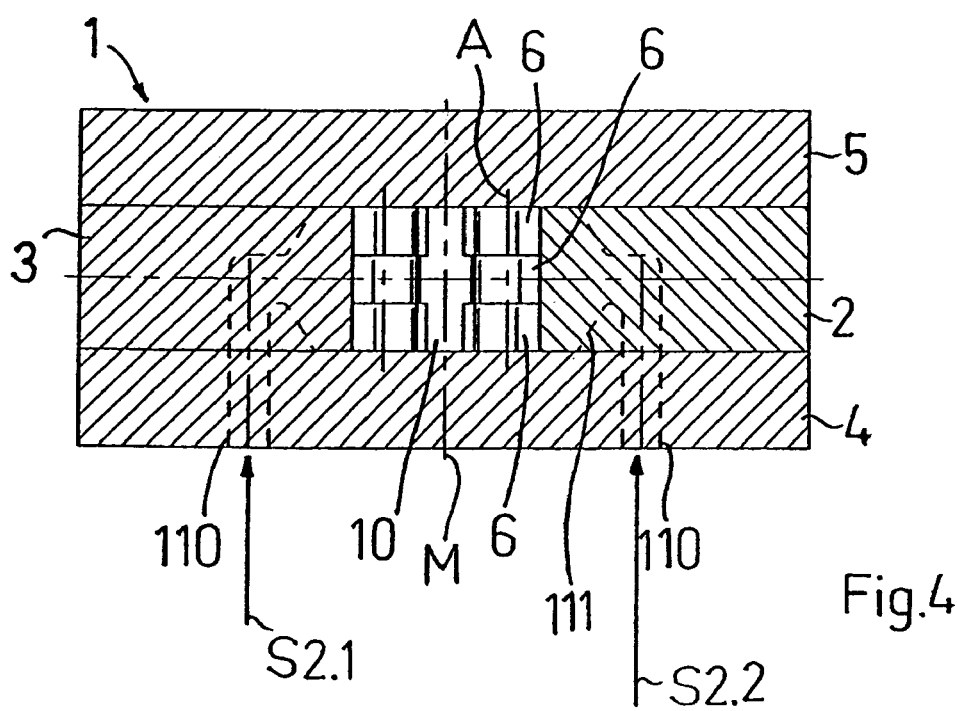

COEXTRUSION ADAPTER

BACKGROUND OF THE INVENTION

1. Field of the Invention

This invention relates to a coextrusion adapter for an extrusion installation with several extruders and a tool supplied by the extruders for producing a composite coextrusion structure of thermoplastic material, wherein the coextrusion adapter has a central conduit with an end at the inlet side for connecting an extruder and an end at the outlet side for connecting a tool, the coextrusion adapter has at least one coextrusion conduit with an inlet end and an outlet end, a further extruder can be respectively connected to the inlet end and the outlet end terminates downstream of the end at the inlet side of the central conduit in the latter, and adjusting devices are assigned to each outlet end of the at least one coextrusion conduit, which have a plurality of adjusting elements which together extend over the width of the outlet end and which can be adjusted independently of each other by actuating drives so that the inside diameter of the respective transverse section of the outlet end can be changed.

2. Discussion of Related Art

Known coextrusion adapters are used for bringing together molten strands of thermoplastic materials coming from several extruders, for example while producing films, plates and panels. For this purpose, the individual melts of thermoplastic material provided by the extruders are brought together in the coextrusion adapter in the desired layer position and are then conveyed together to the extrusion tool for producing the composite coextrusion structure.

While layering different plastic materials within the coextrusion adapter, such as is often the case in actual use, different properties of the plastic materials, in particular different viscosities, or deviations from the selected material flow-through conditions of the individual extruders, must be compensated.

German Patent Reference DE-OS 37 41 793, which establishes the species, provides adjustment devices at the respective outlet end of the coextrusion conduits, which have a plurality of adjusting elements, which together extend over the width of the outlet end and can be adjusted by actuating drives in such a way that the inside diameter of the respective transverse section of the outlet end can be changed. Thus it is possible to affect the cross-sectional profile of the coextruded layer, which is supplied through the coextrusion conduit to the central circuit and the melt conveyed through it. This takes effect individually differently over the entire width of the coextrusion conduit, so that layer thickness tolerances, material throughput, as well as viscosity differences can be compensated. However, with this known device it is only possible to affect the profile of the melt flow supplied through the coextrusion conduit, while profiling of the melt flow moving in the central conduit, which would be desirable for achieving exact tolerances within the composite coextrusion structure, is not possible.

It is known from German Patent Reference DE 197 57 827 A1 to arrange a multi-layer adapter with separators tapering to a point in the meeting area between the central conduit and the coextrusion conduits, wherein the separators are designed as a multitude of separating plates over the entire width of the coextrusion conduits and can be adjusted independently of each other. Although a simultaneous effect on the thickness profile of the melt flowing inside the central conduits, as well as the melt inflowing through the coextrusion conduit is possible, it is not possible to affect the selected setting from the outside without interrupting the production. Instead, it is necessary to remove the separators having a plurality of separator plates from the multi-layer adapter, to adjust it as desired and then to reinstall it, wherein an interruption of the production occurs in each case. Thus the known device is essentially only suited for model tests, in which it is intended to determine the optimally best possible shape of the separator, and wherein afterwards a solid separator without adjustment possibilities is produced from the model having separator plates and used during production.

It is known from European Patent Reference EP 0 161 812 B1 to provide wing-like separating elements, which are pivotable around a pivot axis extending over a width of the coextrusion conduits, by which a compensation of viscosity and pressure differences can be performed in the individual conduits wherein, however, the separating element is seated pivotably in a free-floating manner, for example it is not intended to provide a desired adjustment by exterior adjusting elements. Because the known separating element extends continuously in one piece over the entire width of the coextrusion conduit, a profiling of the inside diameter which differs over the width of the coextrusion conduit is not possible.

SUMMARY OF THE INVENTION

It is one object of this invention, departing from a device as taught by German Patent Reference DE-OS 37 41 793, to further develop a coextrusion adapter in such a way that simultaneous influencing of the flows and the thickness profiles is possible in the central conduit, as well as in the area of the outlet ends of the coextrusion conduits, and this individually differently over the entire width of the central conduit and the outlet ends of the at least one coextrusion conduit.

In accordance with this invention, the embodiment of a coextrusion adapter meeting this object has characteristics described in the claims and in this specification.

In one embodiment of this invention, at their end facing the outlet end, the adjusting elements has a wedge-shape adjusting section, with one wedge surface facing the central conduit, and another wedge surface facing the outlet end of the coextrusion conduit. The adjusting section of the adjusting elements can be pivoted around an axis extending over the width of the outlet end by the actuating drives, so that in case of an increase in the inside diameter of the respective transverse section of the outlet end the corresponding transverse section of the central conduit is narrowed, and vice versa.

In accordance with this invention, it is possible to individually adjust the individual adjusting elements to get a desired thickness profile by their respective actuating drives over the entire width of the outlet end of a coextrusion conduit so that the desired inside diameter exists in the respective transverse sections of the outlet end. Simultaneously, an opposite adjustment of the inside diameter of the corresponding transverse section of the central conduit is caused, so that it is possible with the adjusting elements to achieve a profiling of the melt flow in the central conduit, as well as simultaneously the corresponding profiling of the coextrusion melt flow entering the central conduit via the outlet end of the coextrusion conduit. Thus, with the adjusting elements the coextrusion adapter in accordance with this invention makes it possible to affect the profiling of all layers of the composite coextrusion structure as desired.

In this case there is always a reciprocal influence on the central conduit and the coextrusion circuit in the way that, when increasing the inside diameter of the outlet end of the coextrusion conduit in a transverse section covered by the respective adjusting element, the corresponding transverse section of the central conduit is correspondingly reduced, or narrowed, and vice versa.

In a preferred embodiment of this invention, the adjusting elements are designed with a cylindrically thickened seating section adjoining the adjusting section, with a center axis that constitutes the pivot axis, and the adjusting elements can be pivotably inserted with the respective cylindrical seating section in corresponding receptacles in the coextrusion adapter. A simple assembly and production of the coextrusion adapter is thus possible, and at the same time the adjusting elements are held, easily pivotable around their pivot axes, in spite of the very high pressures occurring in a coextrusion adapter, and are also sealed against the melt in the central conduit and the coextrusion conduit.

Also, the adjusting elements are preferably but not necessarily designed with an adjusting lever at their end facing away from the adjusting section, which can be connected with the actuating drive, so that the desired adjustment movement of the individual adjusting elements with their adjusting sections can be accomplished from the outside by this actuating drive.

Here, the adjusting elements are preferably embodied in one piece with the adjusting section, the thickened seating section and the adjusting lever.

Threaded rods, each of which is accessible from the outside of the coextrusion adapter and can be screwed into, or out of the coextrusion adapter are preferably provided as actuating drives, which have on their ends facing the adjusting element a contact element for the adjusting element. It is also possible to provide other adjusting elements, such as translatory devices, motor-driven linear drives and the like.

The actuating drives can also be equipped with a measuring device for the displacement path. In the simplest case, a measuring bolt, which is rigidly connected with the contact element of the actuating drive, is used as the measuring device which, corresponding to the operation of the actuating drive, projects more or less from the coextrusion adapter, and from whose graduation the displacement path traveled can be read off. It is also possible to provide displacement transducers, for example inductive displacement transducers, inside the actuating drive, which measure the respective displacement path traveled and can pass it on to an installation control device, for example.

It is possible to provide a connecting element for the actuating drives of the adjusting elements extending over the width of an outlet end, by which these adjusting elements can be adjusted together in parallel. Thus it is possible by the actuation of each individual actuating drive to first specify an individual profile for the inside diameter of the outlet end of the coextrusion conduit, and then to displace this profile parallel by means of the simultaneous operation of all actuating drives connected by the connecting element.

For the compensation of viscosity fluctuations, as well as different material throughputs of the individual melts conveyed through the coextrusion conduits, a distribution area can be provided upstream of the outlet end of the coextrusion conduit, in which a dam element for the conveyed plastic melt is arranged. Preferably this dam element can be exchangeable, so that it can be made with different contours and thus can be matched to different rheological properties of the thermoplastic material conveyed through the respective coextrusion conduit.

In one embodiment of the coextrusion adapter in accordance with this invention there are two lateral plates, between which two conduit elements are arranged, which are spaced apart from each other and form the central conduit, wherein each conduit element is equipped with coextrusion conduits arranged laterally reversed with respect to the center axis of the central conduit and associated adjusting elements and actuating drives. Examples of such coextrusion adapters include those with one or several coextrusion conduits, for example one to three coextrusion conduits per conduit element, so that a total of six coextrusion conduits, as well as the central conduit, are provided for conducting the plastic melts, so that a maximally seven-layered composite coextrusion structure made of thermoplastic materials can be produced. It is possible to provide still further coextrusion conduits for further layers.

A particularly simple manufacture of a coextrusion adapter results if the inlet ends of the respective coextrusion conduits are arranged in the areas of the joints between the lateral elements and the conduit elements. In this case, it is possible when producing the lateral elements and conduit elements to cut halves of each of the inlet ends of the coextrusion conduits, for example by milling, into the surfaces of the lateral elements and conduit elements, which will later face the joint. Thus, when putting the lateral elements together with the conduit elements, the desired inlet ends of the coextrusion conduits are formed. It is thus possible to also produce difficult conduit paths of the coextrusion conduits in a simple way by milling, so that it is possible to do without the complicated eroding methods now used.

In one embodiment of the coextrusion adapter in accordance with this invention, the at least one coextrusion conduit can be sealed with respect to the central conduit by the associated adjusting elements when not in use. A great flexibility of the coextrusion adapter is thus provided, because it can always be designed with the amount of coextrusion conduits to be expected, and with composite coextrusion structures, for which fewer coextrusion conduits are needed because of the reduced numbers of layers, the remaining unneeded coextrusion conduits are simply closed by the adjusting elements without elaborate retooling being required.

BRIEF DESCRIPTION OF THE DRAWINGS

Further details of this invention are explained in view of exemplary embodiments shown in the drawings, wherein:

FIG. 3 shows an embodiment of the coextrusion adapter in accordance with this invention, in vertical section;

FIG. 4 shows a section taken along the line V-V through the coextrusion adapter in accordance with this invention;

DESCRIPTION OF PREFERRED EMBODIMENTS

Figure 1:
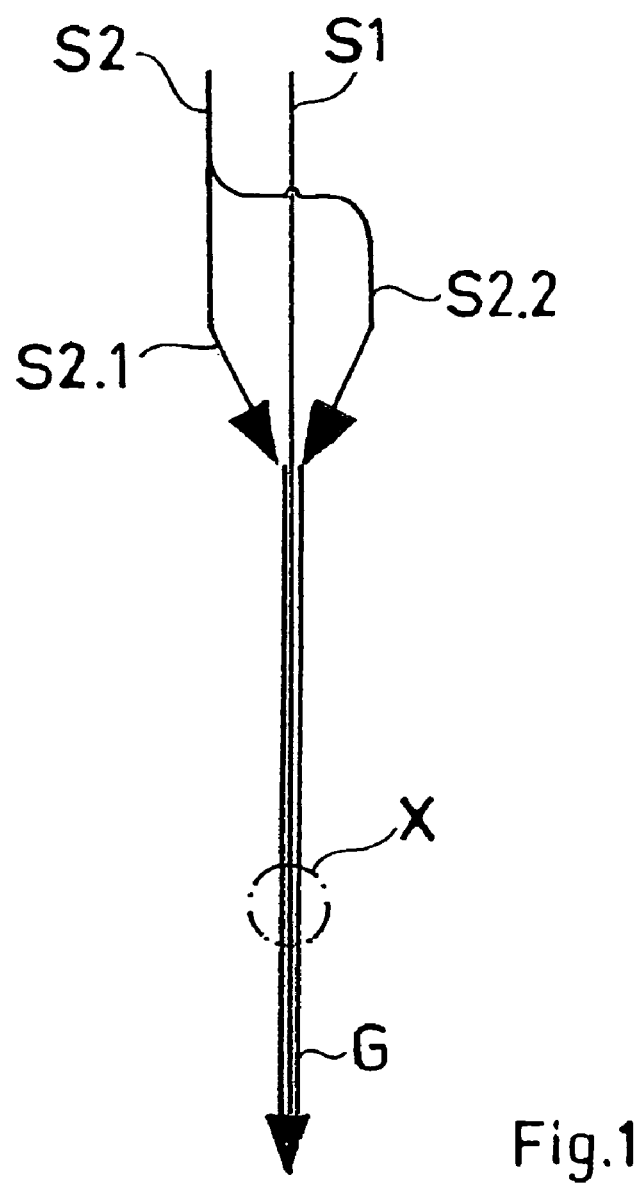
FIG. 1 is a schematic representation of the functional principle of a coextrusion adapter in accordance with this invention.

One functional principle of a coextrusion adapter for producing a multi-layer composite coextrusion structure made of a thermoplastic material is shown in FIG. 1. Different melt flows S1, S2 made of identical or different thermoplastic materials are produced by two different extruders, not shown, and are supplied under high pressure to a coextrusion adapter. In this case, the melt flow S1 is conveyed substantially in a straight line without a change of direction through a central conduit of the coextrusion adapter, which will be explained in detail later, in the direction toward the tool.

Figure 2:
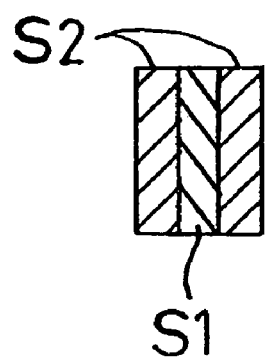
FIG. 2 shows the detail X in FIG. 1 in an enlarged representation.

In contrast, the melt flow S2 is divided into two partial flows S2.1 and S2.2 and is conducted via coextrusion conduits on both sides to the flow S1 moving in the central conduit and are layered on top of each other to form a three-layered composite structure, such as shown in FIG. 2, wherein the melt flows S2 constitute or form the outer layers and the melt flow S1 the inner layer of the total flow G formed in this way, which is subsequently conducted to the tool, not shown. Because of possible rheological differences in the individual plastic material of the melt flows S1, S2, and/or different material throughputs, it is beneficial to pay attention to the moment when the melt flows S1, S2, or S2.1 and S2.2, are brought together.

FIGS. 3 and 4 show an exemplary embodiment of a coextrusion adapter 1, described in principle above, which comprises two conduit elements 2, 3 separated from each other and forming the central conduit 10, in each of which a coextrusion conduit 11 is formed. The conduit elements 2, 3 are embodied laterally reversed with respect to the center axis of the central conduit 10.

Both conduit elements 2, 3 are connected by lateral plates 4, 5, which at the same time also delimit the narrow sides of the central conduit 10, which has a rectangular cross section.

Because of the axial symmetry it is now possible to provide further details by one conduit element and the further components arranged therein, they correspondingly apply to the further laterally reversed conduit element.

Corresponding to the explanations regarding FIG. 1, the melt flow S1 brought in from a first extruder enters the central conduit 10 at an end 100 on the inlet side and initially flows by itself through this central conduit 10 as far as the area where the two coextrusion conduits S11 in the lateral elements 2, 3 terminate with their respective outlet ends 112 in the central conduit 10. The partial flows S2.1, S2.2 of the melt flow 2, which had been previously divided by a separating element, not shown, first reach a distribution area 111 via inlet ends 110 cut into the lateral element 4, for example, in which they are spread out over the entire width of the outlet end 112, and then enter via the entire width of the outlet end 112 into the central conduit 10, which can be the same width. The melt flows S2.1 and S2.2, brought in through the coextrusion conduits 11 enclose the melt flow 11 previously conveyed in the central conduit 10, so that the composite structure results, which as shown in FIG. 2, which then leaves the central conduit 10 through the outlet side end 101 to enter a connected tool, not shown, for producing a composite extrusion structure. The central conduit 10 is appropriately widened in steps in the feed area of the two coextrusion conduits 11 in order to provide sufficient space for the two introduced melt flows.

For compensating fluctuations in the material throughput of the melt flows S1, S2, as well as possibly existing different rheological properties of the individual plastic materials, adjusting elements 6 are provided, which are assigned to each outlet end 112 of the coextrusion conduits 11 and are arranged in the transverse extension of the outlet end 112 and of the central conduit 10 designed to be of the same width, such as shown in the view from above in accordance with FIG. 4, in particular. In the embodiment shown, a total of three adjusting elements 6 are arranged side-by-side or, in the representation in FIG. 3, one behind the other, in order to cover the entire width of the outlet end 112 of the coextrusion conduits 11 and the entire width of the central conduit 10.

Here, at its end facing the outlet end 112, each adjusting element 6 comprises a wedge-shaped adjusting section 60 tapering to a point which, viewed in the flow direction through the central conduit, tapers and whose one wedge surface 60a faces the central conduit 10, and whose other wedge surface 60b faces the outlet end 112 of the coextrusion conduit 11. Accordingly, the adjusting section 60 contacts the melt on both sides in the area of the two wedge surfaces 60a, 60b, such as in the area of the wedge surface 60a with the melt conveyed in the central conduit 10, and in the area of or near the wedge surface 60b with the melt from the coextrusion conduit 11 leaving the outlet end 112. The uniting of the melt flows from the central conduit 10 and the coextrusion conduit 11 occurs at the wedge tip of the adjusting section 60. To avoid too great a change in direction, in this case the outlet end 112 of the coextrusion conduit 11 is designed with a slant in the direction toward the flow direction through the central conduit 10.

Adjoining the adjusting section 60, each adjusting element 6 has a cylindrically thickened seating section 61, by which the adjusting elements 6 are introduced into corresponding receptacles 21 in the respective conduit elements 2, 3 of the coextrusion adapter 1. This cylindrically thickened seating section 61 is exactly matched to the receptacles 21 in the conduit elements 2, 3, so that an escape of melt from the central conduit 10 and/or the coextrusion conduit 11 along the joint between the seating section 61 and the receptacle 21 is prevented, but that simultaneously a pivotability of the seating section and the adjusting section 60 formed on it around the axis A, such as shown in FIG. 4 and extending in the transverse extension of the outlet end 112 of the coextrusion conduit 11, is assured. In this case the center axis of the seating section 61 simultaneously constitutes or forms the pivot axis A.

Thus a pivoting movement of the wedge-shaped adjusting section 60 in accordance with the arrow P2 around the pivot axis A is possible because of the pivotable seating of the seating section 61 inside the conduit elements 2, 3.

This has one result that, depending on the pivot movement in the arrow direction P2, the inside diameter of the respective width section of the outlet end 112 spanned by an adjusting section 60 can be increased or reduced and correspondingly and in the opposite way the inside diameter of the respective width section of the central conduit 10 is decreased or increased.

If the inside diameter of the outlet end 112 is increased by pivoting the adjusting section 60 in the arrow direction P2 toward the left as shown in FIG. 3, the inside diameter of the central conduit 10 in this width section is simultaneously narrowed, and vice versa. One reason for this is that the wedge surfaces 60a, 60b of the adjusting section 60 contact on the one side with the melt flow in the central conduit 10, and on the other side with the melt flow in the coextrusion conduit 11, or its outlet end 112, so that the corresponding reciprocal influence is possible.

For the appropriate adjustment or pivoting of the adjusting section 60, each adjusting element 6 has an adjusting lever 63 on its side facing away from the adjusting section 60, which operatively connects with an actuating drive 7.

The actuating drive 7 has a threaded rod 71 which is extended to the outside of the conduit elements 2, 3 of the coextrusion adapter 1, which can be screwed into or out of the respective conduit element 2 or 3 by the action of a turning tool in the arrow direction P1. On its end facing the adjusting element 6, the threaded rod 71 has a contact element 70, which is connected with the adjusting lever 63, so that the desired pivot movement of the adjusting element 60 in the arrow direction P2 can be caused by actuating the threaded rod 71 in the arrow direction P1.

Screwing in or out of the threaded rods 71 is thus possible with a threaded nut 72, which is held in place by a check plate 74 and screws 75, through which the threaded rod 71 is screwed.

Also, the respective displacement path of the threaded rod 71 can be read at any time from the outside via a measuring bolt 73, which is rigidly fastened to the contact element 70, and can be measured.

For providing sufficient mobility of the actuating drive 7 and the adjusting element 6, the two conduit elements 2, 3 each need to have recesses 20 of sufficient size, which receive the above mentioned components in accordance with the possible movements.

Figure 5:
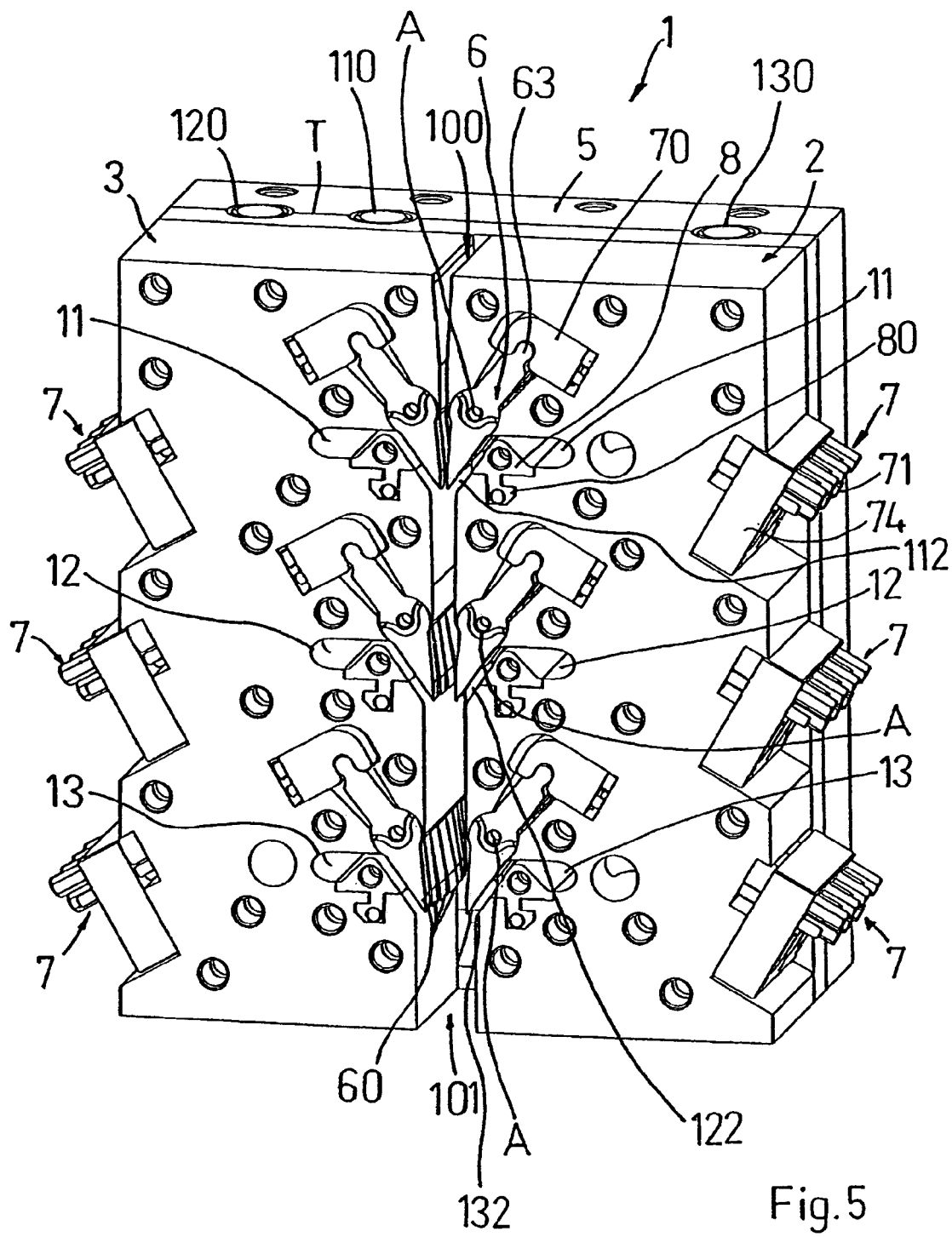
FIG. 5 shows a further embodiment of the coextrusion adapter in accordance with this invention, in a perspective representation.
Figure 6:
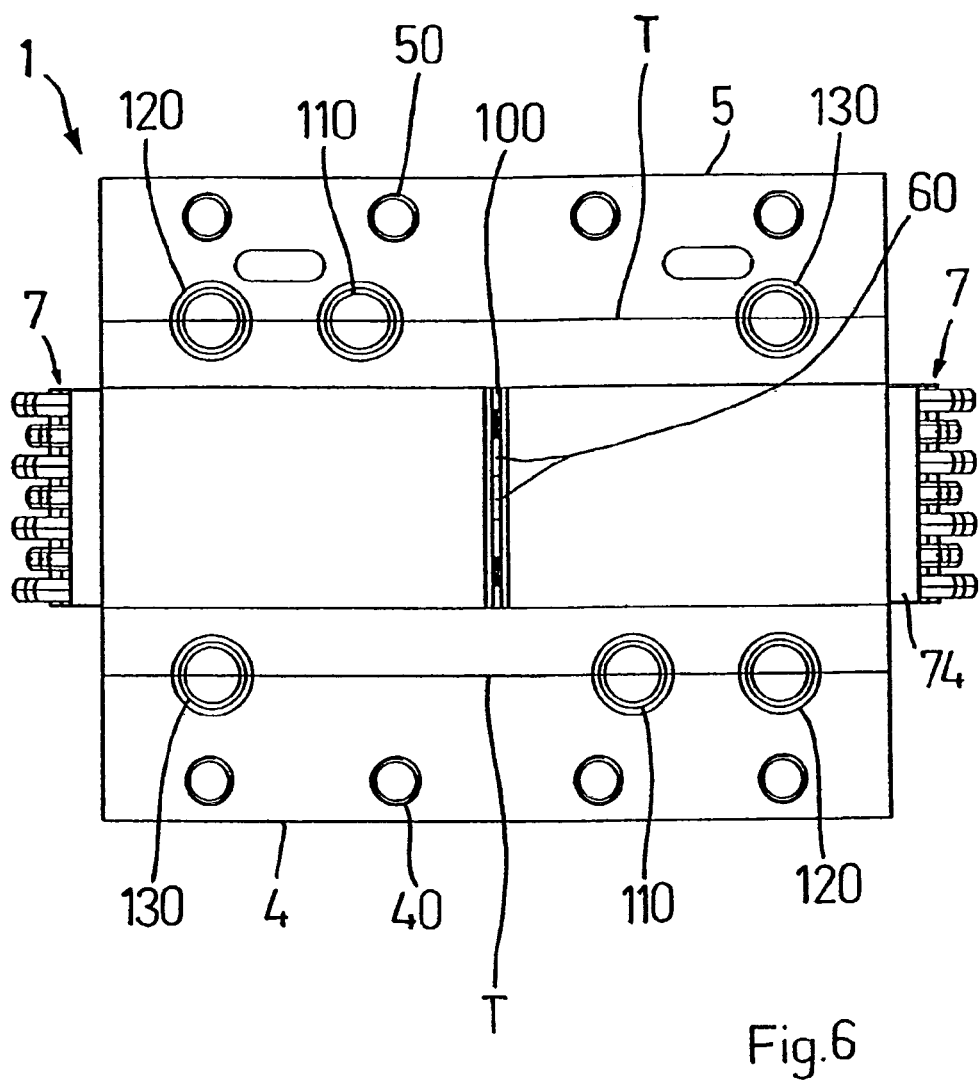
FIG. 6 is a top view of the coextrusion adapter shown in FIG. 5, in accordance with this invention.

In one embodiment of a coextrusion adapter as shown in FIGS. 5 and 6, wherein parts equal to those in the coextrusion adapter shown in FIGS. 3 and 4 and previously described have the same reference symbols and will not be separately described again in what follows to avoid repetitions.

In contrast to the coextrusion adapter shown in FIGS. 3 and 4, which has only one coextrusion conduit 11 in each conduit element 2, 3, so that a maximally three-layered composite extrusion structure can be produced as a whole, the coextrusion adapter 1 represented in FIGS. 5 and 6 has three coextrusion conduits 11, 12, 13 in each of its conduit elements 2, 3, which are arranged, viewed in the flow direction through the central conduit 10, sequentially arranged and have respective outlet ends 112, 122, 132, so that maximally a seven-layered composite extrusion structure can be produced as a whole with this represented coextrusion adapter 1.

The conduit elements 2, 3 are arranged between lateral elements 4, 5, wherein the lateral element 4 is removed, such as shown in FIG. 5.

In this embodiment, the configuration and design of the conduit elements 2, 3, as well as the coextrusion conduits, adjusting elements and actuating drives arranged therein, can be selected so that they are respectively embodied laterally reversed with respect to the center axis M extending through the central conduit 10, so that their embodiment can be explained by the example of a coextrusion conduit.

As shown by the perspective view of FIG. 5, and also the top view of FIG. 6, the respective adjusting elements 6 assigned to an outlet end 112, 122, 132 of the coextrusion conduits 11, 12, 13 can be embodied with different widths, wherein the center adjusting elements 6 have a greater width than the outer adjusting elements 6, which becomes clear by the adjusting sections provided with the reference numeral 60 of the coextrusion conduit 13. Preferably, the adjusting sections 60 can have a width of 5 to 30 mm, in particular 10 to 25 mm.

During operation of the coextrusion adapter shown in FIGS. 5 and 6, initially a melt flow S1 enters the central conduit 10 via the end 100 at the inlet side, whereupon melt flows brought in through the coextrusion conduits 11 in the conduit elements 2, 3 are placed on the outside of the initial flow. Thereafter, a further outer layer from the coextrusion conduits 12 is placed on the three-layered melt flow and conveyed in the correspondingly widened section of the central conduit 10, and following this, a further outer layer from the coextrusion conduits 13 is placed on the now five-layered composite extrusion structure. Thus, a seven-layered composite extrusion structure can be formed and supplied via the end 101 on the outlet side to a tool, not shown. During this, an individual and, if required, different profiling of the respective melt flow entering from the coextrusion conduits 11, 12, 13, as well as simultaneously an opposite profiling of the melt flow moving in the central conduit 10, is made possible by the individual adjusting elements 6 provided at the outlet ends 112, 122, 132 of the coextrusion conduits 13.

The respective feeding of the individual melts to the end 100 at the inlet side of the central conduit and to the coextrusion conduits 11, 12, 13 is shown in FIG. 6, in particular.

A first melt flow from a first extruder directly arrives at the open end 100 on the inlet side of the central conduit 10 via an adapter connected upstream of the coextrusion adapter 1 but not shown here, and there enters from above in the extrusion adapter 1.

The melts to be supplied to the coextrusion conduits 11, 12, 13 in the respective conduit elements 2, 3 are respectively introduced into the coextrusion adapter 1 via inlet ends 110, 120, 130 and reach a distribution area, not separately identified here, but which had already been explained by FIGS. 3 and 4, via an interior conduit system, from where the respective melt reaches the outlet end 112, 122, 132 of the coextrusion conduits 11, 12, 13, and finally the central conduit 10. For compensating possibly existing rheological differences in the individual melts, dam elements 8 can be provided upstream of each outlet element 112, 122, 132 of the coextrusion conduits 11, 12, 13, over which the melts are conducted prior to their entry into the respective outlet end 112, 122, 132. By selecting their individual contours, the dam elements 8 can be individually matched to the respective rheological properties of the conveyed plastic melt and to the material throughput, and can be exchangeably held by base elements 80 formed on them in corresponding insertion grooves of the conduit elements 2, 3, so that a respective individual adaptation to the worked thermoplastic materials can occur.

In order to be able to produce the previously mentioned conduit system, starting at the inlet ends 110, 120, 130 up to the outlet ends 112, 122, 132 in a particularly simple manner, the inlet ends 110, 120, 130 and the continuing conduit section in the area of the joints T between the lateral elements 4, 5 and the conduit elements 2,3 are each introduced in halves, so that they can be produced with little manufacturing outlay when producing the lateral elements 4, 5 and conduit elements 2,3 by milling of the respective surface, which later faces the joint T. Thus, it is possible to avoid complicated methods, such as eroding, when forming the inlet ends 110, 120, 130 and the continuing conduit sections of the respective coextrusion conduits 11, 12, 13.

Also, in the drawing of FIG. 6, further bores 40, 50 in the lateral elements 4, 5 are shown, in which temperature-regulating elements can be received and/or adapters for the extruder can be fastened.

It is possible to provide the individual inlet ends 110, 120 or 130 of the coextrusion conduits 11, 12, 13, which are formed in both conduit elements 2, 3, and the coextrusion conduits 11, 12, 13, which are oppositely located in a laterally reversed manner, with a melt flow, which is divided in accordance with FIG. 1 and coming from an extruder, as well as it being possible to provide each inlet end 110, 120, 130 of a coextrusion conduit 11, 12, 13 in the two lateral elements 2, 3 with separate melt flows from separate extruders.

Finally, in case of non-use, it is also possible to seal individual extrusion conduits 11 with respect to the central conduit 10 by the appropriate closure of the outlet end 112, 122, 132 by a corresponding movement of the closure element 6, so that rather than forming six coextrusion conduits 11, 12, 13 for the respective seven-layered composite coextrusion structure, it is possible to produce composite coextrusion structures with a smaller number of layers, and to close the coextrusion conduits 11 not needed for this in a simple manner by the closure elements 6. Retooling time for the coextrusion adapter is thus minimized.

German Patent Reference 20 2004 011 742.8, the priority document corresponding to this invention, and its teachings are incorporated, by reference, into this specification.

What is claimed is:

1. A coextrusion adapter for an extrusion installation with a plurality of extruders and a tool for producing a composite coextrusion structure of thermoplastic material, wherein the coextrusion adapter (1) has a central conduit (10) with an end (100) at an inlet side for connecting an extruder and an end (101) at an outlet side for connecting the tool, the coextrusion adapter (1) has at least one coextrusion conduit (11, 12, 13) with an inlet end (110, 120, 130) and an outlet end (112, 122, 132), wherein a second extruder can be respectively connected to the inlet end (110, 120, 130), the outlet end (112, 122, 132) terminates downstream of the end (100) at the inlet side of the central conduit (10) in the central conduit, and adjusting devices are assigned to each of the outlet ends (112, 122, 132) of the at least one coextrusion conduit (11, 12, 13), which has a plurality of adjusting elements (6) that together extend over a width of the outlet end (112, 122, 132) and which can be adjusted independently of each other by actuating drives (7) in such a way that an inside diameter of the respective transverse section of the outlet end (112, 122, 132) can be changed, the coextrusion adapter comprising: at the end facing the outlet end (112, 122, 132) the adjusting elements (6) having a wedge-shape adjusting section (60) with one wedge surface (60*a*) facing the central conduit (10) and another wedge surface (60*b*) facing the outlet end (112, 122, 132) of the coextrusion conduit (11, 12, 13), the adjusting section (60) of the adjusting elements (6) pivotal around an axis (A) extending over the width of the outlet end (112, 122, 132) by the actuating drives (7), and when an increase of the inside diameter of the respective transverse section of the outlet end (112, 122, 132) occurs the corresponding transverse section of the central conduit (10) is narrowed, and vice versa, wherein the adjusting elements (6) have an adjusting lever (63) on an end facing away from the adjusting section (60), which can be connected with the actuating drive (7).

2. The coextrusion adapter in accordance with claim 1, wherein the adjusting elements (6) have a cylindrically thickened seating section (61) adjoining the adjusting section (60) with a center axis that forms the pivot axis (A), and the adjusting elements (6) can be pivotably inserted with the cylindrical seating section (61) in corresponding receptacles (21, 31) in the coextrusion adapter (1).

3. The coextrusion adapter in accordance with claim 1, wherein when not used the coextrusion conduit (11, 12, 13) is sealed with respect to the central conduit (10) by the associated adjusting elements (6).

4. The coextrusion adapter in accordance with claim 2, wherein the actuating drives (7) comprise a threaded rod (71) which is accessible from an outside of the coextrusion adapter (1) and can be screwed one of into and out of the coextrusion adapter (1), which has on an end facing the adjusting element (6) a contact element (70) for the adjusting element (6).

5. The coextrusion adapter in accordance with claim 4, wherein the actuating drives (7) have a measuring device for a displacement path.

6. The coextrusion adapter in accordance with claim 5, wherein a connecting element for the actuating drives (7) of the adjusting elements (6) extending together over the width of the outlet end (112, 122, 132) displaces the actuating elements (7) together in parallel.

7. The coextrusion adapter in accordance with claim 6, wherein the at least one extrusion conduit (11, 12, 13) has a distribution area located upstream of the outlet end (112, 122, 132), and a dam element (8) is arranged in the distribution area.

8. The coextrusion adapter in accordance with claim 7, wherein the dam element (8) is exchangeable.

9. The coextrusion adapter in accordance with claim 8, wherein two conduit elements (2, 3) are arranged between two lateral plates (4, 5) and are spaced apart from each other and form the central conduit (10), and each of the conduit elements (2, 3) has one of the at least one coextrusion conduit (11, 12, 13) arranged laterally reversed with respect to a center axis (M) of the central conduit (10) and to associated adjusting elements (6) and the actuating drives (7).

10. The coextrusion adapter in accordance with claim 9, wherein the inlet ends (110, 120, 130) of the coextrusion conduits (11, 12, 13) are arranged near joints (T) between the lateral elements (4, 5) and the conduit elements (2, 3).

11. The coextrusion adapter in accordance with claim 10, wherein when not used the coextrusion conduit (11,12, 13) is sealed with respect to the central conduit (10) by the associated adjusting elements (6).

12. The coextrusion adapter in accordance with claim 1, wherein the actuating drives (7) comprise a threaded rod (71) which is accessible from an outside of the coextrusion adapter (1) and can be screwed one of into and out of the coextrusion adapter (1), which has on an end facing the adjusting element (6) a contact element (70) for the adjusting element (6).

13. The coextrusion adapter in accordance with claim 1, wherein the actuating drives (7) have a measuring device for a displacement path.

14. The coextrusion adapter in accordance with claim 1, wherein a connecting element for the actuating drives (7) of the adjusting elements (6) extending together over the width of the outlet end (112, 122, 132) displaces the actuating elements (7) together in parallel.

15. The coextrusion adapter in accordance with claim 1, wherein the at least one extrusion conduit (11, 12, 13) has a distribution area located upstream of the outlet end (112, 122, 132), and a dam element (8) is arranged in the distribution area.

16. The coextrusion adapter in accordance with claim 15, wherein the dam element (8) is exchangeable.

17. A coextrusion adapter for an extrusion installation with a plurality of extruders and a tool for producing a composite coextrusion structure of thermoplastic material, wherein the coextrusion adapter (1) has a central conduit (10) with an end (100) at an inlet side for connecting an extruder and an end (101) at an outlet side for connecting the tool, the coextrusion adapter (1) has more than one coextrusion conduit (11, 12, 13) with an inlet end (110, 120, 130) and an outlet end (112, 122, 132), wherein a second extruder can be respectively connected to the inlet end (110, 120, 130), the outlet end (112, 122, 132) terminates downstream of the end (100) at the inlet side of the central conduit (10) in the central conduit, and adjusting devices are assigned to each of the outlet ends (112, 122, 132) of the more than one coextrusion conduit (11, 12, 13), which has a plurality of adjusting elements (6) that together extend over a width of the outlet end (112, 122, 132) and which can be adjusted independently of each other by actuating drives (7) in such a way that an inside diameter of the respective transverse section of the outlet end (112, 122, 132) can be changed, the coextrusion adapter comprising: at the end facing the outlet end (112, 122, 132) the adjusting elements (6) having a wedge-shape adjusting section (60) with one wedge surface (60*a*) facing the central conduit (10) and another wedge surface (60*b*) facing the outlet end (112, 122, 132) of the coextrusion conduit (11, 12, 13), the adjusting section (60) of the adjusting elements (6) pivotal around an axis (A) extending over the width of the outlet end (112, 122, 132) by the actuating drives (7), and when an increase of the inside diameter of the respective transverse section of the outlet end (112, 122, 132) occurs the corresponding transverse section of the central conduit (10) is narrowed, and vice versa, wherein two conduit elements (2, 3) are arranged between two lateral plates (4, 5) and are spaced apart from each other and form the central conduit (10), and each of the conduit elements (2, 3) has one of the more than one coextrusion conduit (11, 12, 13) arranged laterally reversed with respect to a center axis (M) of the central conduit (10) and to associated adjusting elements (6) and the actuating drives (7).

18. The coextrusion adapter in accordance with claim 17, wherein the inlet ends (110, 120, 130) of the coextrusion conduits (11, 12, 13) are arranged near joints (T) between lateral elements (4, 5) and the conduit elements (2, 3).

19. The coextrusion adapter in accordance with claim 17, wherein the adjusting elements (6) have an adjusting lever (63) on an end facing away from the adjusting section (60), which can be connected with the actuating drive (7).

* * * * *